US011908601B2

(12) United States Patent
Ishizaki et al.

(10) Patent No.: US 11,908,601 B2
(45) Date of Patent: Feb. 20, 2024

(54) MAGNETIC RESPONSIVENESS COMPOSITE MATERIAL AND COMPOSITION INCLUDING THE COMPOSITE MATERIAL

(71) Applicant: SOMAR CORPORATION, Tokyo (JP)

(72) Inventors: Hirohisa Ishizaki, Tokyo (JP); Akira Ochiai, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 276 days.

(21) Appl. No.: 17/228,896

(22) Filed: Apr. 13, 2021

(65) Prior Publication Data

US 2021/0327622 A1 Oct. 21, 2021

(30) Foreign Application Priority Data

Apr. 15, 2020 (JP) .................................. 2020-72663

(51) Int. Cl.
*H01F 1/44* (2006.01)
*H01F 1/28* (2006.01)

(52) U.S. Cl.
CPC ............... *H01F 1/445* (2013.01); *H01F 1/28* (2013.01)

(58) Field of Classification Search
CPC . H01F 1/445; H01F 1/28; H01F 1/447; H01F 1/44; H01F 1/442
See application file for complete search history.

(56) References Cited

U.S. PATENT DOCUMENTS

2006/0269751 A1* 11/2006 Winstead ........... G01N 33/5434 428/407
2008/0160277 A1* 7/2008 Tamori ............... C01G 49/0027 252/62.51 R
2019/0271694 A1* 9/2019 Nagao .................. G01N 33/543

FOREIGN PATENT DOCUMENTS

JP 661-91907 A 5/1986
JP 2006-275600 A 10/2006

OTHER PUBLICATIONS

Japanese Office Action dated Nov. 8, 2022 issued in corresponding Japanese application No. 2021-065059; English machine translation included (7 pages).
Chinese Office Action from Corresponding Application 202110405273.4, dated May 23, 2023, 11 pages.

* cited by examiner

*Primary Examiner* — Matthew E. Hoban
*Assistant Examiner* — Lynne Edmondson
(74) *Attorney, Agent, or Firm* — Rankin, Hill & Clark LLP

(57) ABSTRACT

There is provided a magnetic responsiveness composite material capable of increasing viscosity by applying a magnetic field when compounded together with a liquid in a composition. The magnetic responsive composite material comprises first particles as core particles composed of a nonmagnetic inorganic material and second particles composed of a magnetic material adhering to at least a part of surfaces of the first particles. A lipophilic treatment agent is applied to at least a part of surfaces of the second particles. The second particles satisfy a relationship of having a smaller average particle diameter than that of the first particles. A lipophilic treatment agent is preferably at least one kind selected from coupling agents and surfactants.

17 Claims, 2 Drawing Sheets

MAGNETIC RESPONSIVENESS COMPOSITE MATERIAL AND COMPOSITION INCLUDING THE COMPOSITE MATERIAL

BACKGROUND OF THE INVENTION

Field of the Invention

The present invention relates to a magnetic responsiveness composite material.

Description of the Related Art

Magnetic fluids and magnetic viscous fluids are known as a magnetic functional fluid reactive to a magnetic field. A magnetic fluid is a colloid solution, wherein magnetic particles having an extremely small particle diameter of a nano (nm) size are dispersed extremely stably by using a surfactant, etc. in a liquid (solvent), does not cause any aggregation or sedimentation of magnetic particles by normal centrifugal force or magnetic field and the liquid itself is strongly magnetic in appearance. A magnetic viscous fluid is a fluid, wherein magnetic particles having a relatively large particle diameter of a micron (μm) size are suspended in a liquid (solvent), and reversibly transforms from a high-fluidity state to a gel state having a large yield stress in accordance with magnetic field intensity.

Magnetic fluids and magnetic viscous fluids serve as a fluid, wherein magnetic particles randomly float in a liquid (solvent) when not affected by any magnetic field (no magnetic field). On the other hand, when a magnetic field is imposed (during excitation), magnetic particles form clusters (chain-shaped aggregates) along the magnetic field direction. In recent years, the characteristic of magnetic functional fluids as such has been utilized and some studies have been made on dampers, brakes and clutches, etc. As one of them, a fluid-based composition containing nonmagnetic particles (polystyrene particles) of a micron size dispersed in a liquid (magnetic fluid), which is a mixture system of a magnetic fluid containing magnetic particles with nonmagnetic particles, has been proposed (Patent Document 1).

RELATED ART DOCUMENTS

Patent Documents

[Patent Document 1] Japanese Patent Unexamined Patent Publication (Kokai) No. H4-198297

SUMMARY OF THE INVENTION

According to the composition of the patent document 1, since nonmagnetic particles repel one another on a uniform magnetic field, resistance in the composition increases. Thereby, an increase of viscosity is also observed in the composition of the patent document 1.

However, since the nonmagnetic particles themselves are not directly affected by any magnetic field, the effect of increasing viscosity of the composition is limited and still not enough.

An object of the present invention is to provide a magnetic responsiveness composite material capable of increasing viscosity when compounded in a composition together with a liquid and applied with a magnetic field.

The present inventors found that the object above can be attained by bringing magnetic particles, which float randomly in a liquid when no magnetic field is imposed but form clusters along the magnetic field direction during excitation, adhere to surfaces of the nonmagnetic particles as above so as to form a composite structure, wherein nonmagnetic particles can bond to one another via the magnetic particles when a magnetic field is imposed, and completed the present invention.

Namely, according to the present invention, a magnetic responsiveness composite material having the configuration explained below and a composition including the composite material can be provided.

The magnetic responsiveness composite material of the present invention comprises first particles as core particles composed of a nonmagnetic inorganic material; and second particles composed of a magnetic material adhered to at least a part of surfaces of the first particles;

wherein, when an average particle diameter of the first particles is D1 and an average particle diameter of the second particles is D2, a relationship of D1>D2 is satisfied, and a lipophilizing treatment agent adheres to at least a part of surfaces of the second particles.

Preferably, the lipophilizing treatment agent is at least one kind selected from coupling agents and surfactants. Preferably, the surfactants as an example of the lipophilizing treatment agent are 6-22C saturated fatty acids or salts thereof or unsaturated fatty acids or salts thereof.

Preferably, D1 is 10 times D2 or more and 1000 times D2 or less.

Preferably, a ratio of the second particles in a sum of the first particles and the second particles is 5 wt % or more and 50 wt % or less.

The magnetic responsiveness composite material of the present invention brings out a characteristic (1) below in a state of being compounded in a composition when a content of the second particles in the magnetic responsiveness composite material is 5 to 50 wt % of a total mass of the magnetic responsiveness composite material.

(1) Viscosity during excitation when a magnetic field of a direct current of 0.8 T was applied to the composition in an atmosphere of 25° C. is at least 2.5 times the viscosity before excitation yet to apply any magnetic field.

The composition above may include a liquid resin material or magnetic functional fluid together with the magnetic responsiveness composite material of the present invention. In the former case, the composition above becomes a resin-based composition, while in the latter case, the composition above becomes a fluid-based composition.

The magnetic responsiveness composite material of the present invention may be a dry blended product of the first particles and the second particles.

The magnetic responsiveness composite material of the present invention has a composite structure, wherein second particles composed of a magnetic material having a lipophilizing treatment agent applied thereto is brought to adhere to at least a part of surfaces of the first particles as core particles composed of a nonmagnetic inorganic material. Consequently, when compounding the composite material in a composition together with a liquid, a plurality of existing composite structured particles of the magnetic responsiveness composite material, bond to one another via their own second particles under a magnetic field and become dense (refer to FIG. 1). When the present state becomes dense, an increase of viscosity of the composition can be expected. As a result, the magnetic responsiveness composite material of the present invention can express more viscosity in the composition than ever.

On the other hand, in the technique in the patent document 1, magnetic particles exist together with spherical polystyrene particles in a composition. Therefore, when a magnetic field is imposed on the composition, a plurality of nano-sized magnetic particles flock and bond to form magnetic particle clusters. Then, due to a magnetic volume effect, the spherical polystyrene particles are pushed out. As a result, the spherical polystyrene particles behave as if they are diamagnetic in relation with the magnetic particles and float in the composition, and the spherical polystyrene particles do not bond via magnetic particles even during excitation not to mention during not excited. Regardless of being under excitation or not, the spherical polystyrene particles do not bond with other spherical polystyrene particles to form a chain shape and it is assumed that they exist in a simply aligned state (refer to FIG. 2). Namely, in the technique in the patent document 1, polystyrene particles cannot exist densely in the composition and the effect of increasing viscosity is not sufficient.

DETAILED DESCRIPTION OF THE INVENTION

Figure 1:
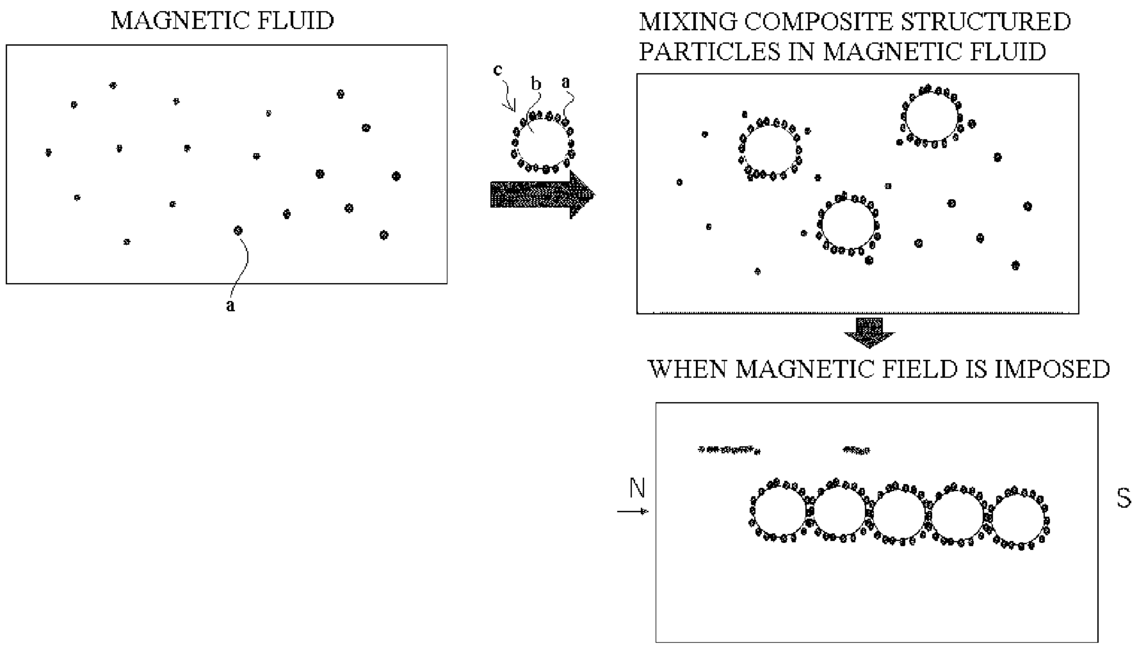
FIG. 1 shows diagrams of a magnetic fluid as an example of a fluid-based composition for explaining respective states of before and during affected by a magnetic field of the magnetic fluid dispersed therein with the magnetic responsiveness composite material of the present invention.

Below, best mode(s) for carrying out the present invention will be explained in detail. An explanation will be made on a magnetic responsiveness composite material, a production method thereof, the composition and magnetic characteristic in this order below.

<1. Magnetic Responsiveness Composite Material>

The magnetic responsiveness composite material of the present invention comprises first particles as core particles and second particles brought to adhere to at least a part of surfaces of the first particles.

(1-1) First Particles

First particles as core particles are composed of a non-magnetic inorganic material (having a specific magnetic permeability of, for example, less than 1.5). As the nonmagnetic inorganic material, metals (for example, gold, silver, copper, nickel, palladium, platinum and cobalt), ceramics (for example, metal oxides, metal nitrides, metal carbides, metal carbonates, metal halides, metal phosphates and metal sulfates), metal-coated resin filler, carbon black and graphite, etc. may be mentioned. As metal oxides, alumina, silica, titanium oxide, zinc oxide, calcium oxide, magnesium oxide, tin dioxide, silicon dioxide, nonmagnetic chromium oxide, cerium oxide, nonmagnetic iron oxide, etc. may be mentioned. As metal carbides, silicon carbide, molybdenum carbide, boron carbide, tungsten carbide and titanium carbide, etc. may be mentioned. As metal carbonates, magnesium carbonate and calcium carbonate, etc. may be mentioned. As metal nitrides, boron nitride and silicon nitride, etc. may be mentioned. As metal halides, calcium fluoride, sodium fluoride, potassium fluoride, cesium fluoride and lithium chloride, etc. may be mentioned. As metal sulphates, barium sulphate and calcium sulphate, etc. may be mentioned. As metal covered resin fillers, those obtained by covering particle surfaces of a resin (including a polyester resin, vinyl resin (acrylic resin, polystyrene resin, polyvinyl acetate resin and polyvinyl chloride resin, etc.), ABS resin, AS resin and other thermoplastic resins; phenol resin, epoxy resin, melamine resin, urea resin, unsaturated polyester resin, alkyd resin, polyurethane resin and other thermosetting resins) with a layer of a metal (gold, silver, copper, nickel, palladium, platinum and cobalt, etc.) may be mentioned.

In one mode, the first particles preferably have a hydroxyl group on the surfaces as a result of reacting with oxygen and water in the air. In terms therewith, as a nonmagnetic inorganic material composing the first particles, specific metals (that is, one or more kinds selected from copper, nickel, palladium, platinum and cobalt), metal oxides (for example, alumina), specific metal-coated resin fillers having a layer of the specific metals (mentioned above) coated on surfaces of the resin (mentioned above) particles may be preferably used. The specific metals mentioned above react with oxygen in the air, an oxidized coating is formed on surfaces thereof and, then, the oxidized coating reacts with water in the air so as to form a hydroxyl group easily. It is the same as to the metal oxides.

These nonmagnetic inorganic materials may be used alone or in combination of two or more kinds. The first particles may be aggregate.

A shape of the first particles is not particularly limited and may be a scale shape, sphere shape, deformed shape or other shapes. The first particles are preferably sphere-shaped in terms of being easy for the magnetic responsiveness composite material to become clusters when second particles (explained later on) adhere to surfaces of the first particles.

An average particle diameter (D1) of the first particles is preferably 0.1 μm or greater, more preferably 1 μm or greater and preferably 70 μm or less and more preferably 60 μm or less.

Although it depends also on an adhesion amount (will be explained later) of second particles to the first particle surfaces, when D1 is the upper limit value above or smaller, an advantage of preventing sedimentation can be obtained easily.

The D1 means a particle diameter (median diameter) when cumulative volume in a cumulative distribution of particle diameters becomes 50%. Specifically, it indicates an average particle diameter measured, for example, by using a laser diffraction particle size distribution measuring device (product name "HELOS and RODOS" produced by Sympatec GmbH).

(1-2) Second Particles

Second particles adhered to the first particle surfaces are composed of a magnetic material (having a specific magnetic permeability of, for example, 1.5 or more). As a magnetic material, for example, ferromagnetic oxides, ferromagnetic metals, metal nitrides and amorphous metals, etc. may be mentioned.

As ferromagnetic oxides, for example, magnetite, γ iron oxide, manganese ferrite, cobalt ferrite, or composite ferrites of these with zinc or nickel, and barium ferrite, etc. may be mentioned. As ferromagnetic metals, for example, iron, cobalt and rare earth, etc. may be mentioned. As amorphous metals, for example, Fe—Si—B type amorphous metal powder, Fe—Si—B—Cr type amorphous metal powder, etc. may be mentioned. Among them, magnetite is preferable in terms of mass productivity.

Surfaces of the second particles are subjected to a treatment using a lipophilizing treatment agent (lipophilizing treatment). If the lipophilizing treatment is not performed on the second particles, they do not adhere firmly to the first particles and may separate from the first particle surfaces.

A shape of the second particles is not particularly limited and may be a scale shape, sphere shape, deformed shape or other shapes.

An average particle diameter (D2) of the second particles may be any if smaller than D1 (D1>D2). It may be selected arbitrarily considering a particle diameter of D1 to be used. D2 is preferably 1/10 of D1 or less and more preferably 1/30 or less. On the other hand, in terms of magnetic responsiveness, it is preferably 1/1000 or greater and more preferably 1/800 or greater. When considering the above, an average particle diameter of D2 is preferably in a range of 10 nm to 5 μm. When using magnetite or γ iron oxide in the case where the use purpose requires superparamagnetism, D2 is preferably 100 nm or less, more preferably 50 nm or less and particularly preferably 10 nm to 40 nm. Note that superparamagnetism means aggregate of ferromagnetic fine particles, which does not exhibit hysteresis nor cause residual magnetization and exhibits a value of 100 to 100000 times comparing with paramagnetic atomic magnetic moment.

D2 is an average primary particle diameter measured by a dynamic light scattering method using, for example, a nanoparticle analysis device (Heros Particle Size Analysis WINDOX 5 produced by Sympatec GmbH).

In the present invention, the second particles only need to adhere to at least a part of surfaces of the first particles.

A ratio of the second particles in a sum of the first particles and second particles (that is, an adhesion ratio of the second particles) is preferably 5 wt % or more, more preferably 10 wt % or more and preferably 50 wt % or less and more preferably 40 wt % or less.

The ratio of the second particles above may be calculated from an element analysis of sample surfaces by energy dispersive X-ray spectroscopy (EDX) using a magnetic responsiveness composite material as the sample.

(1-3) Effects

The magnetic responsiveness composite material of the present invention has a composite structure, wherein second particles, which are composed of a magnetic material subjected to a lipophilicity treatment, adhere to at least a part of surfaces of first particles, which are core particles composed of a nonmagnetic inorganic material. When a magnetic field is imposed in a state, where the above is compounded in a composition, for example, together with a magnetic functional fluid as an example of a liquid (explained later), magnetic particles included in the magnetic functional fluid form clusters (aggregates formed by a plurality of magnetic particles bonded to one another) in the composition and the magnetic responsiveness composite material also forms clusters (aggregates formed by a plurality of composite structured particles of the magnetic responsiveness composite material bonded via their own second particles).

Namely, in the technique in the present invention, since the second particles adhere to the first particles, a plurality of existing composite structured particles of the magnetic responsiveness composite material, bond to one another via their own second particles and, consequently, exist densely (refer to FIG. 1) on a magnetic field. In FIG. 1 when a magnetic field is imposed on the magnetic fluid, not only magnetic particles but composite structured particles form a chain shape because magnetic responsiveness is provided. In the technique in the present invention, when the existence state is dense, the effect of increasing viscosity of the composition enhances furthermore. Also, by controlling the magnetic field, a length and width of the clusters can be controlled in the composition.

Figure 2:
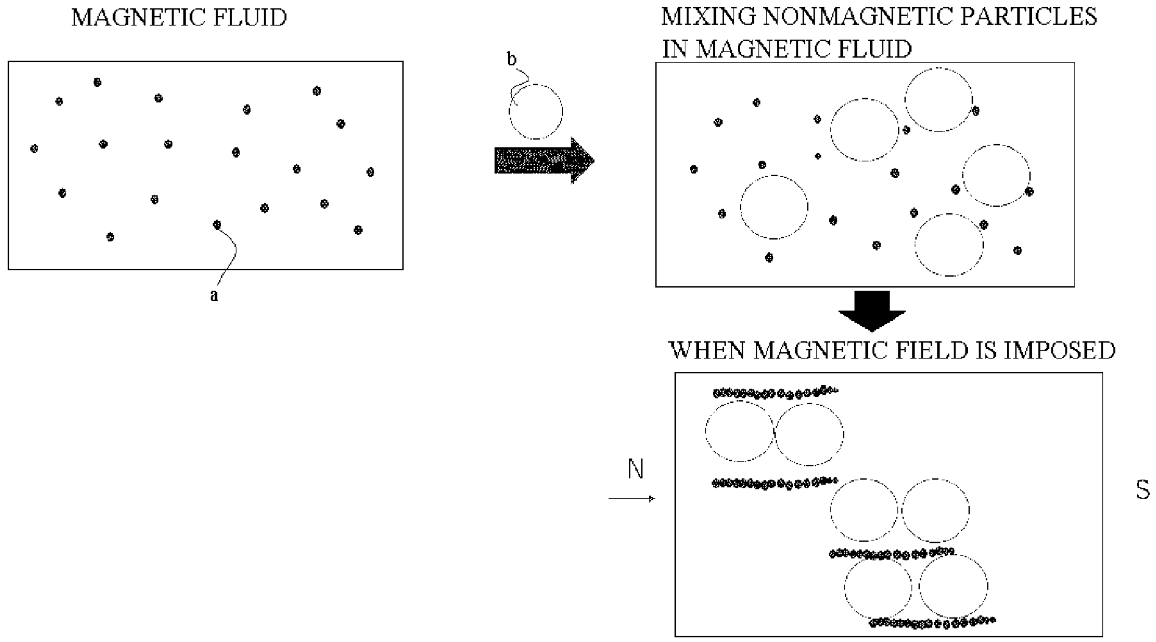
FIG. 2 shows explanatory diagrams of the fluid (a polystyrene particle-containing magnetic fluid) in the patent document 1 in respective states of before and during affected by a magnetic field.

On the other hand, in the technique in the patent document 1, as explained above, polystyrene particles cannot exist densely in the composition (refer to FIG. 2) and the effect of increasing viscosity is not enough. In FIG. 2, the magnetic particles form a chain shape. Since nonmagnetic particles do not have any magnetic responsiveness, they do not form a chain shape. The nonmagnetic particles behave as if they are diamagnetic (repel) to the magnetic particles in a chain shape and float in the magnetic fluid. In FIGS. 1 and 2, "a" is a magnetic particle, "b" is a nonmagnetic particle, and "c" is a composite structured particle of magnetic responsiveness composite material.

<2. Production Method of Magnetic Responsiveness Composite Material>

The magnetic responsiveness composite material of the present invention may be produced by preparing first particles and second particles, for example, both in a powder state and dry blending them at a predetermined ratio. Namely, in one mode, the magnetic responsiveness composite material of the present invention is preferably a dry-blended product of the first particles above and the second particles above. Below, an example of preparing the magnetic responsiveness composite material of the present invention by a dry blend method will be explained.

(2-1) Preparation

Below, the case of using alumina (an example of metal oxides) as a nonmagnetic inorganic material composing the first particles will be explained as an example.

First particles to be prepared may be coated at least on a part of the surfaces thereof with a coupling agent (a silane-type coupling agent and titanate-type coupling agent, etc.) considering convenience (for example, dispersibility, etc.) of the magnetic responsiveness composite material to be produced.

When using those at least a part of the surfaces thereof covered with a coupling agent as the first particles, it is considered that a hydrophilic group of the coupling agent reacts with a part of a hydroxyl group (—OH) existing on a first particle surface and forms chemical bonds, so that the coupling agent adsorbs (chemisorption) at least a part of the first particle surface in a state where its own lipophilic group (hydrophobic group) facing outside, and a hydroxyl group is exposed on a part of the first particle surface not adsorbed with the coupling agent.

In the present invention, as the second particles, a magnetic powder composed of magnetic particles attached with a lipophilizing treatment agent on surfaces thereof is used. As a lipophilizing treatment agent, for example, coupling agents (silane-type coupling agents and titanate-type coupling agents, etc.) and surfactants, etc. may be mentioned. As a lipophilizing treatment, for example, (2) a method of performing a surface treatment on the second particles with a coupling agent or a surfactant and (3) a method of dispersing magnetic particles in an aqueous medium containing a surfactant to obtain a magnetic fluid so as to attach the surfactant to magnetic particle surfaces, etc. may be mentioned.

As a silane-type coupling agent, those having a hydrophobic group, epoxy group or amino group may be mentioned and they may be used alone or in combination of two or more kinds as needed. As a silane-type coupling agent having a hydrophobic group, vinyltrichlorosilane, vinyltriethoxysilane and vinyltris(β-methoxy)silane, etc. may be mentioned. As a silane-type coupling agent having an epoxy group, γ-glycidoxypropylmethyldimethoxysilane, γ-glycidoxypropyltrimethoxysilane and β-(3,4-epoxycyclohexyl) trimethoxysilane, etc. may be mentioned. As a silane-type coupling agent having an amino group, γ-aminopropyltrimethoxysilane, N-β-(aminoethyl)-γ-aminopropyltrimethoxysilane, N-β-(aminoethyl)-γ-aminopropylmethyldimethoxysilane and N-phenyl-γ-aminopropyltrimethoxysilane, etc. may be mentioned.

As a titanate-type coupling agent, isopropyl triisostearoyl titanate, isopropyl tridodecyl benzensuphonyl titanate and isprolyltris (dioctylpyrophosphate) titanate, etc. may be mentioned.

The surfactant is not particularly limited and well-known surfactants may be used. For example, those having a functional group capable of bonding with magnetic particles and with a hydroxyl group on the particle surfaces may be mentioned. As a functional group capable of bonding with a hydroxyl group, a carboxyl group, hydroxyl group and sulfonic acid group, etc. may be mentioned.

As those having a carboxyl group, 6-22C saturated fatty acids or salts thereof or unsaturated fatty acids or salts thereof, etc. of an octanoic acid, decanoic acid, lauric acid, myristic acid, palmitic acid, stearic acid, isostearic acid, oleic acid, linolenic acid, linoleic acid, erucic acid, arachidic acid, arachidonic acid and behenic acid, etc. may be mentioned. Among them, 12-22C saturated fatty acids or salts thereof or unsaturated fatty acids or salts thereof, etc. of lauric acid, myristic acid, palmitic acid, stearic acid, isostearic acid, oleic acid, linolenic acid and linoleic acid, etc. are preferable.

As those having a sulfonic acid group, petroleum sulfonate, synthetic sulfonate, eicosyl naphthalenesulfonic acid and salts thereof, etc. may be mentioned.

A content of the surfactant in the magnetic fluid is, for example, 5 wt % to 25 wt % in terms of a solid content. As to ionic property, those having a cationic or anionic property are preferable. They may be used alone or in combination of two or more kinds in accordance with need.

An adhesion amount of the lipophilizing treatment agent is preferably 10 to 40 wt % with respect to the magnetic particles. When it is less than 10 wt %, second particles do not adhere firmly to the first particles even after later-explaining dry blending in some cases. On the other hand, when it exceeds 40 wt %, coagulation of generated magnetic responsiveness composite material arises and control of a particle size of the magnetic responsiveness composite material becomes difficult.

As to the lipophilizing treatment agent, it is considered that a hydrophilic group thereof reacts with a part of a hydroxyl group existing on the magnetic particle surface and forms chemical bonds, so that the lipophilizing treatment agent adheres (chemisorption) to at least a part of the magnetic particle surface in a state where its own lipophilic group (hydrophobic group) facing outside, and a hydroxyl group is exposed on a part of the magnetic particle surface not adsorbed with the lipophilizing treatment agent.

Magnetic powder used as the second particles may be obtained directly by the method (2) explained above. Also, in the case of (3) above, it is also possible to obtain by removing an aqueous medium.

A method of removing an aqueous medium in the case of (3) above is not particularly limited. For example, (4) a method of adding a coagulating component to the magnetic fluid to cause aggregation and sedimentation of magnetic particles contained in the magnetic fluid and removing a dispersion medium, which is a supernatant; (5) a method of filtering a solid component by using a filter having suitable apertures; (6) a method of removing a dispersion medium by evaporation by heating at a boiling point of the dispersion medium or higher; (7) a centrifugal separation method of applying a centrifugal force to the magnetic fluid to separate magnetic particles covered with a surfactant included in the magnetic fluid; and (8) a method of separating by using a magnet; etc. may be mentioned.

In terms of an efficiency of separation and safety, the method of (4) is preferable. In the method (4), for example, when using isoparaffin as an organic solvent, which is a dispersion medium of a magnetic fluid, it is preferable to use as an aggregating component a solvent containing alcohol (specially ethanol). When an aggregating component is added and agitated, homogeneously dispersed magnetic particles form aggregations and set. Ethanol may be undiluted or a solution having a concentration of 80 wt % or more may be used.

A magnetic fluid in the case of (3) above may be prepared suitably or a product on market may be used, as well. As products on market, for example, the EXP series, P series, APG series and REN series (which are product names and produced by Ferrotec Holdings Corporation), etc. may be mentioned.

(2-2) Mixing

Next, prepared first particles and second particles composed of a magnetic powder are dry blended. A mixing ratio of both particles (the first particles:second particles) is preferably 90:10 to 50:50 and more preferably 80:20 to 60:40 in terms of mass.

Mixing of both of the particles may be performed by a variety of mixing means, such as a mixer, Henschel mixer, Nauta mixer, Banbury mixer and various mixing means may be used. The mixing condition may be, for example, under an environment of a temperature being 10 to 40° C. (preferably, 20 to 30° C.) and humidity 40 to 60% RH.

As a result of dry blending the first particles and the second particles, the magnetic responsiveness composite material of the present invention having the structure that the second particles adhere to (cover) at least a part of surfaces of the first particles as explained above is produced.

The mechanism of obtaining the structure above only by dry blending is not necessarily clear, however, the present inventors consider that as a result of dry blending the both particles, it is easy to form bonding of (a), (b) or (a)+(b) below and the structure above can be obtained thereby. Also, when obtaining the second particles to be mixed with the first particles (that is, when obtaining a powder of magnetic particles), they also consider that washing a solid component with alcohol so as to remove residual dispersant may contribute positively to generation of bonding of (a), (b) or (a)+(b).

(a) A hydroxyl group (explained above) exposed on second particle surfaces reacts with a hydroxyl group (explained above) exposed on first particle surfaces and bonding of M-O-N (M is a second particle and N is first particle) is formed ($M\text{-}OH+N\text{-}OH \rightarrow M\text{-}O\text{-}N+H_2O$).

(b) A lipophilic group (explained above) of a surfactant (a lipophilizing treatment agent) covering at least a part of surfaces of the second particles physically adsorbs a lipophilic group (explained above) of a coupling agent covering at least a part of surfaces of the first particles. A bonding force by the physical adsorption is considered weaker when comparing with that of chemical adsorption in (a).

On the other hand, in the technique in the patent document 1, nonmagnetic particles (polystyrene particles) in micron size are dispersed in a magnetic fluid (a mixture of magnetic fluid containing magnetic particles with nonmagnetic particles).

In the patent document 1, as a substance having a lipophilic group in a mixture system of a magnetic fluid and nonmagnetic particles, a residual dispersant (a dispersant not covering magnetic particle surfaces and floating in the system, having a hydrophilic group and a lipophilic group), a dispersion medium (in the case of a polar solvent, such as water) and a hydroxyl group exposed on magnetic particle surfaces may be considered.

On the other hand, in the same mixture system, as a substance having a lipophilic group, a residual dispersant (explained above), dispersion medium (in the case of a nonpolar solvent, such as paraffine type hydrocarbon oil) a lipophilic group of a dispersant covering at least a part of surfaces of magnetic particles may be considered.

Here, a reaction of a hydroxyl group exposed on magnetic particle surfaces with nonmagnetic particles corresponding to the composite structure of a magnetic responsiveness composite material of the present is not caused.

Namely, in the technique in the patent document 1, there is no chance that polystyrene particles in a state that surfaces thereof covered with magnetic particles exist in the mixture system.

A method of precipitating (wet method) magnetic metal oxides having untreated surfaces (magnetic fine particles having untreated surfaces) on abrasive grain (core) surfaces in a suspension has been known (Patent Document 2: Japanese Patent Unexamined Patent Publication (Kokai) No. 2005-171214). However, when actually using the technique in the patent document 2 to try to produce in a suspension (precipitate second particles on first particle surfaces), bonding of neither (a) nor (b) arose and, consequently, the structure as explained above, wherein second particles adhere to (cover) at least a part of surfaces of the first particles, was not obtained.

<3. Composition>

A composition according to the present embodiment is configured by comprising the magnetic responsiveness composite material of the present invention and a liquid.

A liquid included in the composition only needs to be a material in a state that the substance is in a liquid phase. For example, solvents (water and other inorganic solvents and organic solvents) and liquid resin materials, etc. may be mentioned. Also, it is not limited to a liquid as one state of a material but those obtained by dissolving, dispersing or mixing particles of functional materials composed of a solid substance, such as pigments and metal particles, in a solvent are included in the liquid, as well. Magnetic functional fluids may be mentioned as an example thereof. In the case where the composition of the present embodiment includes a liquid resin material together with a magnetic responsiveness composite material, the resin-based composition is useful for producing molds. When including a magnetic functional fluid instead of a liquid resin material, the fluid system composition is usefully used for dampers, brakes and clutches.

A liquid resin material may be selected, for example, from thermoplastic resins and thermosetting resins. As thermosetting resins, an epoxy resin, phenol resin, melamine resin, polyimide resin, urea resin, unsaturated polyester resin, polyurethane resin and silicone resin, etc. may be mentioned. As a thermoplastic resin, an acrylic resin, polyethylene resin, polypropylene resin, polyvinyl chloride resin, polyvinyl acetate resin, acrylonitrile butadiene styrene copolymer resin and fluororesin, etc. may be mentioned and one or more kinds may be selected arbitrarily for use in accordance with use purpose.

A resin-based composition may be obtained by mixing a magnetic responsiveness composite material with a liquid resin material. The mixing method is not particularly limited and an ordinarily used mixing method may be selected arbitrarily to obtain a resin-type composition.

A mixing ratio of a liquid resin material and a magnetic responsiveness composite material is not particularly limited but generally it is preferable to mix 20 to 300 parts by mass of a liquid resin material with respect to 100 parts by mass of a magnetic responsiveness composite material.

In the resin-based composition, in addition to the magnetic responsiveness composite material and liquid resin material, a variety of components may be included in a range of not undermining the effect of the present invention. For example, a solid resin, crosslinking agent, curing accelerator and release agent, etc. may be mentioned.

As a solid resin material, those in the same kinds as those listed as a liquid resin material may be used arbitrarily.

A crosslinking agent is not particularly limited and those capable of crosslinking with a thermosetting resin may be used arbitrarily. For example, an imidazole-type crosslinking agent, urea-type crosslinking agent and triphenylphosphine, etc. may be mentioned. When using a crosslinking agent, the content with respect to a liquid resin material (when a solid resin material is added, both of a liquid resin material and solid resin material) is preferably 0.05 to 1 wt % and more preferably in a range of 0.2 to 0.5 wt %. A crosslinking agent may be used just one kind or in combination of two or more kinds.

As a release agent, carnauba wax, candelilla wax, ester wax and other waxes may be mentioned.

When using wax, the content with respect to a liquid resin material (when a solid resin material is added, both of a liquid resin material and solid resin material) is preferably 0.05 to 1.0 wt % and more preferably 0.2 to 0.5 wt % in terms of a solid content. Waxes may be used just one kind or in combination of two or more kinds.

A magnetic functional fluid included in the fluid-based composition may be arbitrarily selected from magnetic fluids and magnetic viscous fluids. As explained above, a magnetic fluid is a colloid solution, wherein magnetic particles having an extremely small particle diameter of nano (nm) size are dispersed extremely stably in a liquid by using a surfactant, etc., does not cause any aggregation or sedimentation of magnetic particles by normal centrifugal force or a magnetic field, and the liquid itself is strongly magnetic in appearance. A magnetic viscous fluid is obtained by suspending magnetic particles having a relatively large particle diameter of micron (μm) size in a liquid and is a fluid which reversibly transforms from a high-fluidity state to a gel state having a large yield stress in accordance with magnetic field intensity.

A content of a magnetic responsiveness composite material in a fluid-based composition may be selected arbitrarily based on characteristics of first particles.

<4. Magnetic Characteristic>

In a state of being compounded in a composition, the magnetic responsiveness composite material of the present invention provides the composition with a characteristic of having a high ratio of viscosity during excitation (hereinafter, also referred to as “a relative ratio”) with respect to viscosity before excitation (hereinafter, also referred to as “an initial value”). As a result, an advantage of being able to adjust viscosity in accordance with a magnetic force can be obtained.

The relative ratio may vary depending on a content of the second particles in the magnetic responsiveness composite material, but when the value is, for example, 5 to 50 wt % with respect to the total mass of the magnetic responsiveness composite material, the characteristic (1) below can be brought out in a state of being compounded in a composition.

(1) When imposing a magnetic field of direct current 0.8 tesla (T) to the composition of the present embodiment in an atmosphere at 40° C., viscosity during excitation ($V_{0.8}$ (Pa·S)) is 2.5 times or more (namely, a relative ratio is 2.5 or more) the viscosity before excitation ($V_0$ (Pa·S)) before imposing any magnetic field.

In the present embodiment, a relative ratio is more preferably 3 times or more (namely, $V_{0.8}$ is three times $V_0$ or more). Viscosity during excitation is a value measured by a rheometer under the later explained condition.

EXAMPLES

Below, the present invention will be explained specifically based on examples (including examples and comparative examples), however, the present invention is not limited to these examples. Note that “part” indicates “part by mass” and “%” indicates “wt %” in the description below.

1. Producing Particle Samples

The material below was prepared as first particles.

alumina (spherical nonmagnetic inorganic particles having an average particle diameter D1 of 3 μm)

The material below was prepared as second particles.

magnetite (spherical magnetic particles having an average particle diameter D2 of 25 nm)

As the second particles, a magnetic powder obtained by removing a dispersing medium from a market-available magnetic fluid through the process below was used.

(Producing Second Particles)

First, a magnetic fluid (magnetic particle content was 60%, magnetic particles covered with a dispersant (average primary particle diameter was 25 nm, magnetic particles was magnetite), a dispersant was sodium oleate (an anionic surfactant) and a dispersion medium of isoparaffine) in an amount of 50 ml was fractionated, ethanol (85% solution) in an amount of 50 ml was added thereto and agitated well, so that magnetic particles were aggregated and sedimented. Precipitation time was 24 hours.

Next, ethanol was filtered out and aggregated sediment of magnetic particles was obtained.

The obtained aggregated sediment was flattened, fed into a convection-type oven preheated at 115° C., heated and dried for 8 hours in the convention-type oven and, then, left for 2 hours to cool. When differential thermal analysis was done on the dried magnetic powder (powder aggregate), it was confirmed that 82% of inorganic components and 18% organic components were included. Therefore, it was confirmed that organic components (a surfactant) derived from the magnetic fluid existed at least a part of surfaces of the magnetic particles (with a lipophilizing treatment).

After that, the powder aggregate was pulverized by a mixer to be a fine powder so as to obtain a magnetic powder. An average primary particle diameter (D2) of the pulverized magnetic powder was, as explained above, 25 nm.

Measurement of D2 was made by using a nano particle analyzer (Heros Particle Size Analysis WINDEX 5 produced by Sympatec GmbH).

Experimental Examples 1-4

The first particles and second particles at mass ratios shown in Table 1 were dry blended by using a mixer under the condition of a temperature being 20° C. and humidity 50%, so that particle samples (magnetic responsiveness composite materials) were obtained.

TABLE 1

| | | Experimental Examples | | | |
|---|---|---|---|---|---|
| | | 1 | 2 | 3 | 4 |
| First Particles | Alumina D1 (μm) | 90 | 80 | 70 | 60 |
| | | | 3 | | |
| Second Particles | Magnetite D2 (nm) | 10 | 20 | 30 | 40 |
| | | | 25 | | |

2. Producing Resin-Based Composition

Experimental Examples 5-8 and Reference Example 1

A resin and the respective particle samples obtained in experimental examples 1 to 4 (or samples composed only of the first particles and the second particles are not attached thereto) were mixed at mass ratios shown in Table 2 and resin-based compositions were obtained. The obtained resin-based compositions were evaluated on magnetic characteristic. The results are shown in Table 2.

As the resin, a mixture of a liquid bisphenol A-type epoxy resin and liquid bisphenol F-type epoxy resin at a mass ratio of 1:1 (an epoxy equivalent of 160 to 170 g/eq, viscosity of 2200 mPa·S, at 25° C.) was used.

3. Evaluation (3-1) Adsorption Mode of Second Particles

Figure 3:
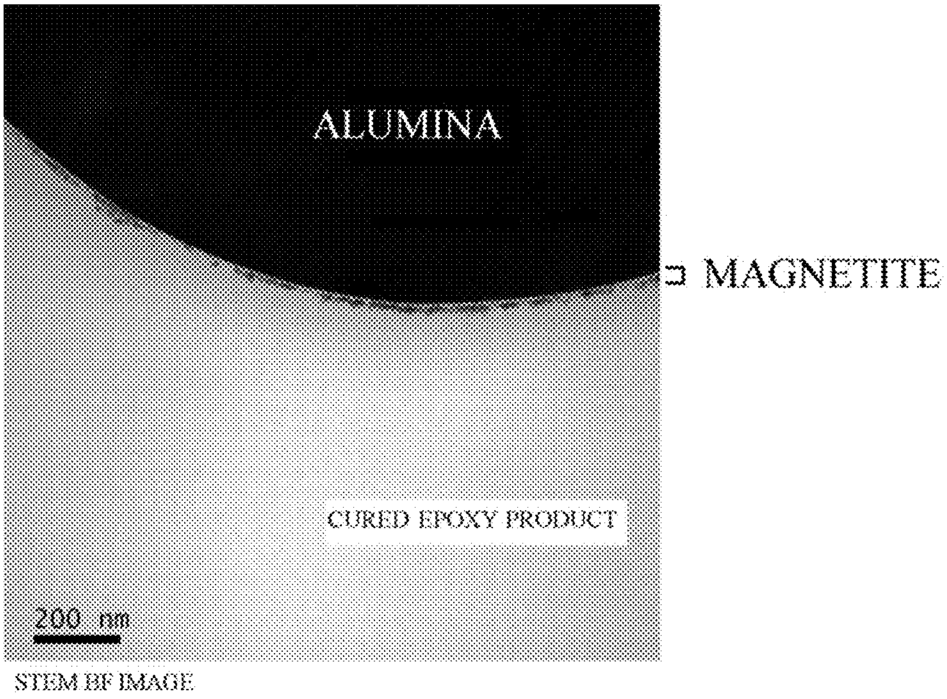
FIG. 3 is a bright field (BF) image (magnification of 100,000) of a resin-based composition obtained in Example 7 observed with a scanning transmission type electron microscope (STEM).
Figure 4:
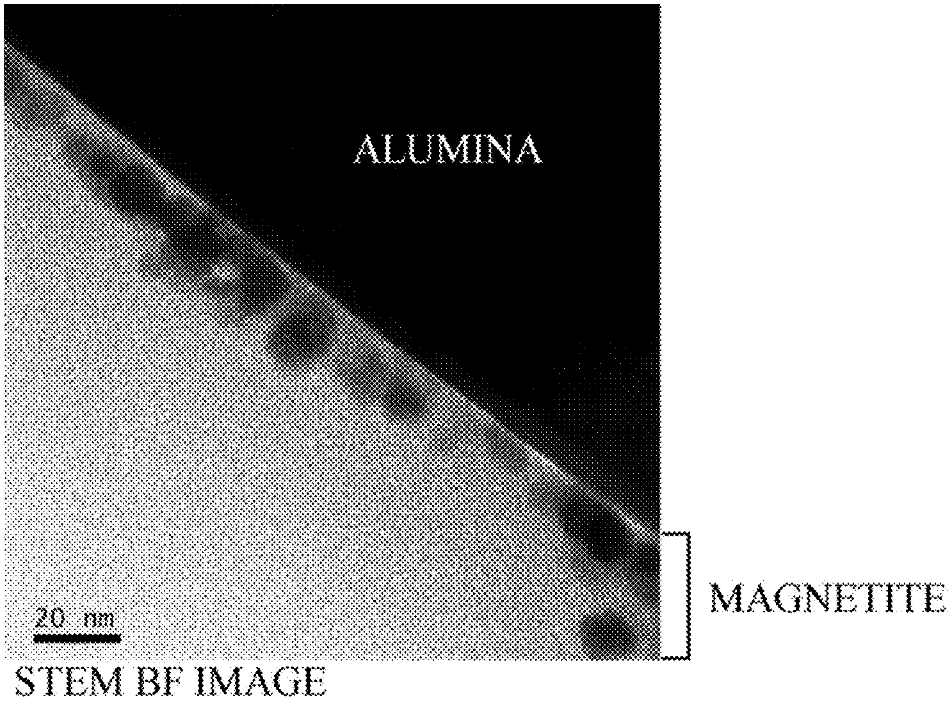
FIG. 4 is a bright field (BF) image (magnification of 1,000,000) of the resin-based composition obtained in Example 7 observed with a STEM.

One sample (a resin-based composition obtained in experimental example 7 containing a particle sample in example 3) among the obtained plurality of resin-based composition was observed with a STEM (product name JEM-2200FS produced by JEOL Ltd.) and a BF image was obtained. FIG. 3 shows an observation result at a magnification of 100,000 and FIG. 4 shows an observation result at a magnification of 1,000,000. An accelerating voltage was 200 kV.

As shown in FIG. 3 and FIG. 4, in the particle samples, it was confirmed that the second particles adhered to surfaces of the first particles to cover a part of surfaces of the first particles.

(3-2) Magnetic Characteristics

Respective resin-based compositions obtained in the experimental examples 5-8 and reference example 1 were injected to test plates, the test plates were set on a rheometer DHR-2 attached with magnet rheology option produced by TA Instruments in an atmosphere at 25° C., so that viscosity before excitation $V_0$ (Pa·S) and viscosity during excitation $V_{0.8}$ (Pa·S) were measured and a relative ratio thereof (viscosity during excitation/viscosity before excitation) was calculated. The evaluation condition was as below.

Condition of imposing magnetic field: A magnetic field of direct current of 0.8 T was applied 30 seconds after starting measurement and the magnetic field application was released (stopped) 50 seconds after starting measurement. A gap distance was 100 μm.

TABLE 2

| | Experimental Example 5 | Experimental Example 6 | Experimental Example 7 | Experimental Example 8 | Reference Example 1 |
|---|---|---|---|---|---|
| Resin | 50 | 50 | 50 | 50 | 50 |
| First Particles | 45 | 40 | 35 | 30 | 50 |
| Second Particles | 5 | 10 | 15 | 20 | 0 |
| Viscosity $V_0$ Before Excitation | 12 | 18 | 23 | 28 | 5.5 |
| Viscosity $V_{0.8}$ During Excitation | 34.5 | 61.9 | 92 | 123.7 | 5.5 |
| Relative Ratio | 2.9 | 3.4 | 4 | 4.3 | 1 |

4. Consideration

As shown in Table 2, actual measurement values of viscosity during excitation $V_{0.8}$ in experimental example 7 and reference example 1 were 92 (Pa·S) and 5.5 (Pa·S), respectively, and initial values $V_0$ thereof were 23 (Pa·S) and 5.5 (Pa·S), respectively. As a result, their calculated relative ratios were 4 and 1, respectively.

Note that, in experimental example 7, it means that rise of a ratio of viscosity during excitation with respect to the initial values (relative ratio) is caused by formation of clusters as a result that sample particles (magnetic responsiveness composite material) bonded to one another via their own second particles.

In experimental example 7, it was confirmed that the relative ratio became 4 times the case in reference example 1. From the result, it was confirmed that the product of the present invention (magnetic responsiveness composite material) is capable of realizing a resin-based composition having a high ratio (relative ratio) of viscosity during excitation with respect to the initial value comparing with existing products (composed only of the first particles and not having the second particles adhered thereto).

The invention claimed is:

1. A composition comprising a liquid and a magnetic responsiveness composite material suspended in the liquid, wherein the liquid is a liquid resin material, the magnetic responsiveness composite material comprises:

first particles as core particles composed of a nonmagnetic inorganic material; and second particles composed of a magnetic material adhered to at least a part of surfaces of the first particles, when an average particle diameter of the first particles is D1 and an average particle diameter of the second particles is D2, a relationship of D1>D2 is satisfied, a lipophilizing treatment agent adheres to at least a part of surfaces of the second particles.

2. The composition according to claim 1, wherein the liquid resin material consists of one of a thermoplastic resin and a thermosetting resin.

3. The composition according to claim 1, wherein the lipophilizing treatment agent is at least one kind selected from coupling agents and surfactants.

4. The composition according to claim 3, wherein the surfactants are saturated fatty acids or salts thereof or unsaturated fatty acids or salts thereof.

5. The composition according to claim 4, wherein D1 is 10 times D2 or more and 1000 times D2 or less.

6. The composition according to claim 5, wherein a ratio of the second particles in a sum of the first particles and the second particles is 5 wt % or more and 50 wt % or less.

7. The composition according to claim 6, wherein a content of the second particles in the magnetic responsiveness composite material is 5 wt % to 50 wt % of a total mass of the magnetic responsiveness composite material, and a viscosity during excitation when a magnetic field of a direct current of 0.8 T is applied to the composition in an atmosphere of 25° C. is at least 2.5 times a viscosity of the composition before excitation.

8. The composition according to claim 7, wherein the magnetic responsiveness composite material is a dry blended product of the first particles and the second particles.

9. The composition according to claim 1, wherein D1 is 10 times D2 or more and 1000 times D2 or less.

10. The composition according to claim 3, wherein D1 is 10 times D2 or more and 1000 times D2 or less.

11. The composition according to claim 1, wherein a ratio of the second particles in a sum of the first particles and the second particles is 5 wt % or more and 50 wt % or less.

12. The composition according to claim 3, wherein a ratio of the second particles in a sum of the first particles and the second particles is 5 wt % or more and 50 wt % or less.

13. The composition according to claim 4, wherein a ratio of the second particles in a sum of the first particles and the second particles is 5 wt % or more and 50 wt % or less.

14. The composition according to claim 1, wherein a content of the second particles in the magnetic responsiveness composite material is 5 wt % to 50 wt % of a total mass of the magnetic responsiveness composite material, and a viscosity during excitation when a magnetic field of a direct current of 0.8 T is applied to the composition in an atmosphere of 25° C. is at least 2.5 times a viscosity of the composition before excitation.

15. The composition according to claim 1, wherein the magnetic responsiveness composite material is a dry blended product of the first particles and the second particles.

16. The composition according to claim 3, wherein the magnetic responsiveness composite material is a dry blended product of the first particles and the second particles.

17. The composition according to claim 4, wherein the magnetic responsiveness composite material is a dry blended product of the first particles and the second particles.

* * * * *